United States Patent [19]
Proulx

[11] 4,145,809
[45] Mar. 27, 1979

[54] ROTARY MOWER CUTTING HEADS WITH FLEXIBLE CUTTING BLADES

[76] Inventor: Raymond E. Proulx, 5837 Cameo St., Alta Loma, Calif. 91701

[21] Appl. No.: 881,193

[22] Filed: Feb. 27, 1978

[51] Int. Cl.² .................. A01D 55/18; A01G 3/06
[52] U.S. Cl. .............................. 30/276; 56/12.7
[58] Field of Search .............. 30/276, 347; 15/12.7, 15/295

[56] References Cited
U.S. PATENT DOCUMENTS

| 4,020,552 | 5/1977 | Mizuno et al. | 30/276 |
| 4,047,299 | 9/1977 | Bair | 30/276 |
| 4,091,538 | 5/1978 | Akiyama | 30/276 |
| 4,095,338 | 6/1978 | Naohiko et al. | 30/276 |
| 4,114,269 | 9/1978 | Ballas, Sr. | 30/276 |

Primary Examiner—Jimmy C. Peters
Attorney, Agent, or Firm—Boniard I. Brown

[57] ABSTRACT

A cutting head for rotary mowers, trimmers, and edgers for vegetation, having a rotating body from which flexible flail-like filamentous cutting blades extend radially. The device contains improvements over the cutting head described in my copending application Ser. No. 722,015. The flails are preferably of high-strength organic polymer such as nylon monofilament and exit from the rotating body through grommets. The improved grommets are molded from a bearing material of plastic filled with powdered dry lubricant and metal particles. The head has raised ramp portions alongside each grommet to protect the grommet. Sharp-edged radial ribs on the top of the rotating body operate to deter weed and grass stems from wrapping and binding about the upper body.

10 Claims, 7 Drawing Figures

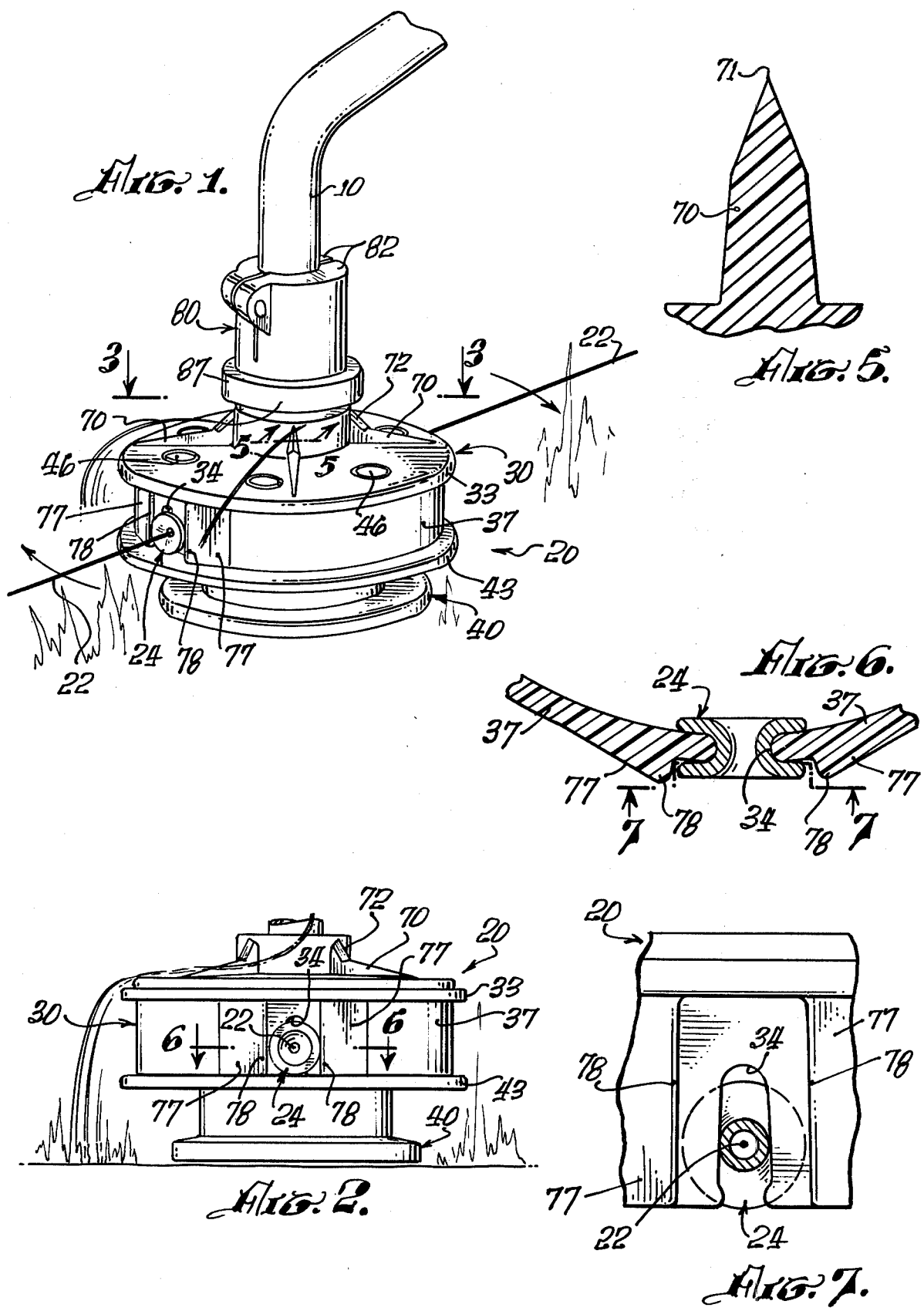

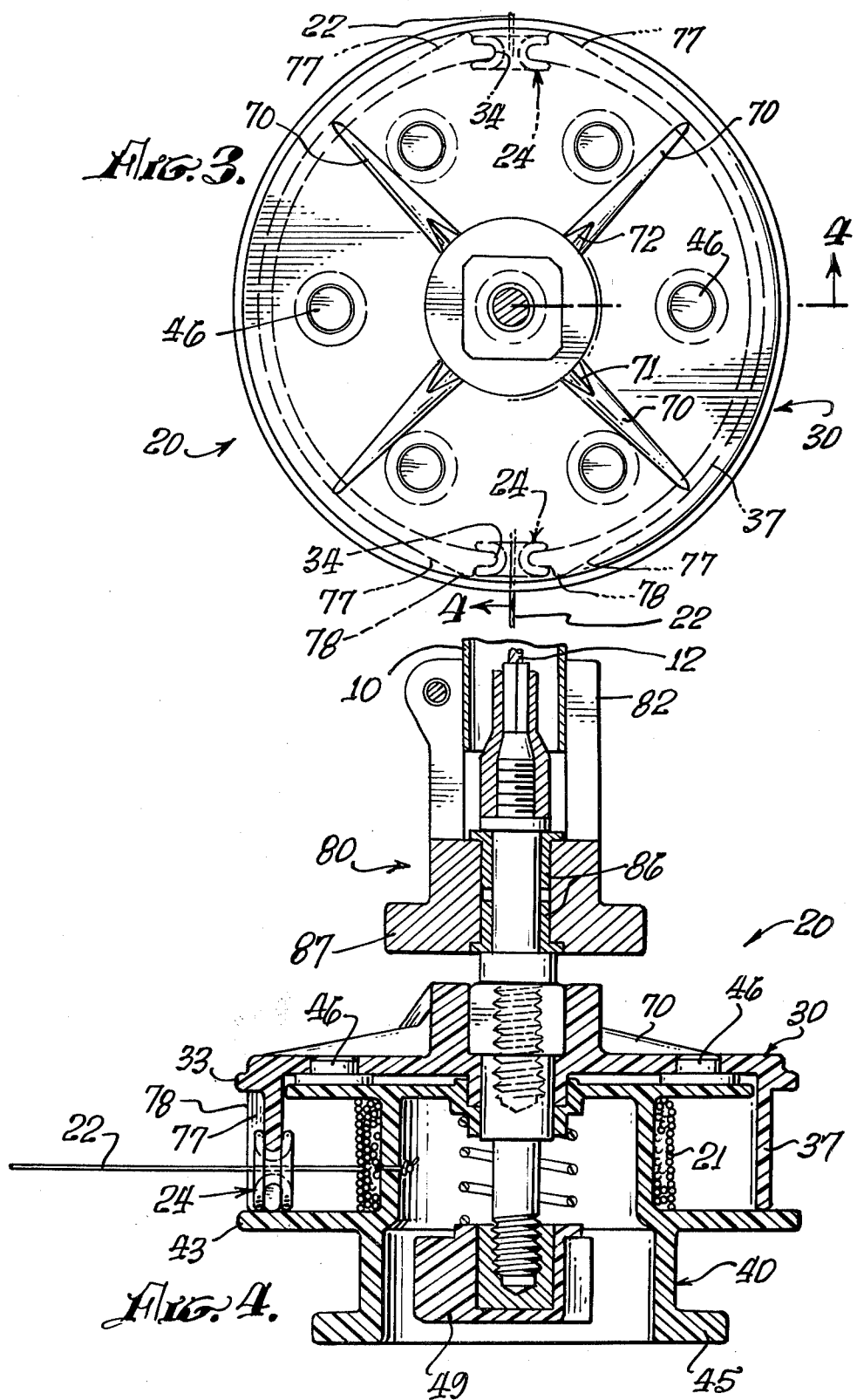

ROTARY MOWER CUTTING HEADS WITH FLEXIBLE CUTTING BLADES

BACKGROUND OF THE INVENTION

This invention relates to an improved cutting head for mowing and trimming devices for grass, weeds, and other vegetation, of the rotating type equipped with flexible cord-like flails formed of generally cylindrical fibers. Grass and weed cutters of this general type are now widely used. Examples are described in the following U.S. Pats.: Reber, No. 3,664,102; Ballas, et al., No. 3,826,068; Mizuno, et al., No. 4,020,552; and Ballas, et al., No. 4,035,912, and in my copending U.S. application Ser. No. 722,105 filed Sept. 10, 1978, now U.S. Pat. No. 4,097,991, issued July 4, 1978. The present invention is directed to improvements in such devices. The problems addressed herein are: (1) protection of flails and grommets from damage in use; (2) lengthening the life of flails and grommets; and (3) deterring cut weed stems and the like from wrapping and binding about the rotating cutting head.

SUMMARY OF THE INVENTION

A rotary cutting head for vegetation, of the type employing flexible filamentous flails as the cutting elements, is constructed on the same basic plan as the head in my prior application referred to above but with the following improvements.

In addition to the protective circumferential flanges above and below the grommets through which the flails exit, there are provided protruding ramp portions on the cylindrical surface through which the grommets extend. These ramp portions are disposed on either side of each grommet and extended radially outward beyond the grommet. They protect the grommets from impacting any solid objects encountered which pass between the protective flanges.

The grommets themselves are preferably molded from a bearing material of plastic having fillings of a small percentage of a powdered molybdenum disulfide compound plus about 45 percent by weight of tiny bronze spheres. Such grommets wear longer than plain plastic under the vibrating of flapping action of the flails during operation in cutting vegetation, and wear the filaments less than metal grommets.

Weed stems, tall grass, and the like are deterred from wrapping, accumulating, and binding around the head and handle by means of novel sharp radial ribs on the top of the rotating head. The ribs are sharp on the top and higher toward the center of the head, terminating just under the lower collar-like surface of the stationary bearing block at the end of the handle. Plant matter that gets wrapped around the upper portion of the rotating head also gets pulled in toward the center, and hence gets forced against the upwardly-sloping sharp edges of the radial ribs. The ribs then cut into the wrapped material so that it becomes weakened or severed, and thrown off by centrifugal force.

BRIEF DESCRIPTION OF THE DRAWINGS

FIG. 1 is a perspective view of a complete cutting head according to the invention;

FIG. 2 is a side view of the rotary body of the same head;

FIG. 3 is a top view of the body;

FIG. 4 is a side section on line 4—4 of FIG. 3;

FIG. 5 is a transverse sectional detail of one of the radial cutting ribs, on line 5—5 of FIG. 1;

FIG. 6 is a detail section of a grommet and ramps, on line 6—6 of FIG. 2; and

FIG. 7 is a detail section showing a grommet, on line 7—7 of FIG. 6.

DESCRIPTION OF THE PREFERRED EMBODIMENT

So far as applicable, the refernece numerals herein are the same as those used for the corresponding elements in my copending application Ser. No. 722,015, referred to above. For purposes of clarity, the structure common to that disclosure will first be summarized briefly.

Referring to FIG. 1, the cutting head, indicated generally at 20, is mounted on a bearing block 80 which is fastened to a handle 10. The cutting body 30, 40 is rotated by a flexible shaft (shown at 12 in FIG. 4) which passes through the hollow handle 10 and is rotated by suitable external motor means.

A pair (or more) of filamentous, flexible flails 22, 22, FIGS. 1, 3, and 4, are impelled into a radially-extending attitude by the centrifugal force of rotation. These are the elements that cut the grass or other vegetation by whip-like impact, in known manner.

The flails 22 may preferably be of nylon filament, which is stored on a spool inside the body at 21 (FIG. 4). The ends come out through grommets 24 which are held in slots 34 in the cylindrical skirt portion 37 of the head. See particularly the detail of FIG. 7.

As shown in FIG. 4, the body is made in two main components, a cap 30 and a spool 40. Flail filament material 21 is stored on spool 40 inside the body, its end extending out through the grommets 24 in the cylindrical skirt portion 37 of cap 30 to form the active flails 22.

The cutting head of the invention, indicated generally at 20, has three main components: the handle 10, the bearing block 80, and the rotating body 30, 40. The bearing block 80 has a split portion at 82 which is clamped around the handle 10. See FIG. 1.

Referring again to FIG. 4, suitable shaft means extend from the bearings 86 in bearing block 80 down into the cutting body, in the same manner as shown in the above copending application. The cap portion 30 and spool portion 40 of the body are held in alignment by top pins 46 (FIGS. 3-4) and held together by a wing nut 49 on the bottom of the spool portion 40. Cap 30 and spool portion 40 may be separated after unscrewing the wing nut 49, to pay out more of the flail filament 21 or to replace it.

The distinct features of the present invention will now be described. Referring to FIGS. 1, 2, 6, and 7, ramp portions 77 are provided on the cylindrical skirt portion 37 of cap 30, disposed on either side of each grommet 24. The grommets 24 fit in vertically-elongated slots 34 in the skirt portion 37 (FIG. 7) so that they can slide up and down. The protective ramp portions 77 are shown best in the detail sectional view of FIG. 6. The rise gradually in the radial direction as they approach the grommets 24, to a maximum radial extent beyond the grommets of about 2 to 5 times the diameter of the filament 21, 22: typically about 0.5 cm. The ramp portions are then rounded toward the grommet. They are shaped so as not to catch on external objects, and may be described as shaped in the general form of a wedge with a rounded corner at 78, FIG. 6, extending between the flanges 33, 43 and radially beyond the basic diameter of skirt portion 37.

Objects encountered by the rotating ramp portions 77 will be kicked outward, away from the cutting head. The ramps 77 are preferably integral portions of the skirt 37 of cap 30, which is preferably molded of a high-impact plastic material. The ramps work in cooperation with the flanges 33, 43 to prevent impact damage to the grommets and flails while preserving the protective function of the grommets on the flails.

Another feature of the invention is the material employed for the grommets 24: a plastic filled with metal particles plus a small percentage of powdered dry lubricant. A suitable molding compound is available commercially from Rislan Corporation of Glen Rock, New Jersey, under the trade designation "BMNY-BZ-TL"; it is intended for bearings. It is found that in the operation of the present cutting head, transverse vibrational waves travel back and forth along the flails, causing the flails to flap rapidly and fairly continuously against the walls of the openings through the grommets, as well as to "saw" in and out. When the grommets are made of metal, the resulting pounding tends to weaken the filaments. When the grommets are of plain unfilled plastic, such as nylon, there is local heating from the friction and the grommets tend to wear undesirably.

The improved metal-filled plastic grommets 24 of the present invention, FIGS. 1-4, 6, and 7, provide a degree of hardness intermediate between plastic and metal, higher heat conductivity, and a lower coefficient of friction than either. The result is less breakage of filament and longer life of the grommets. The molding compound referred to above consists of Nylon 11 molding material plus a few percent of molybdenum disulfide powdered lubricating agent, plus about 85 percent by weight (about 45 percent by volume) of powdered metal in the form of tiny bronze spheres.

Referring now to FIGS. 1-5, the invention provides sharp radial ribs 70 on the top of the body cap member 30. These extend radially inward and upward, ending just below the lower collar-like portion 87 of the stationary bearing block 80 which is clamped to handle 10 (FIG. 1). Four such ribs is a suitable member, as shown; but not restrictive. Each rib 70 has a sharp top edge 71, as shown best in FIG. 5. The purpose of the ribs is to cut into and separate plant material that gets wrapped around the rotating body 20, so that the material is severed or weakened and thrown off. Without such provision, prior cutting heads tend to accumulate wrapped weed stems and the like until they jam up at the center, below and against the collar or the like 87, or even wrap around the handle 10 and stall the machine.

The radial ribs 70 are shaped to be higher and sloping inward more steeply toward the cneter. Preferably, as shown in FIGS. 1 and 2, the inner portion of each rib has a steeply sloping segment 72 toward the center, which terminates closely under the lower surface of the bottom collar-like portion 87 of the bearing block 87. Plant stems, tall grass, and like material which begins to wind or wrap around the head will be pulled toward the center by the tension. Here the material encounters the sharp edges 71 of the sloping inner segments or portions 72 of the ribs 70, which cut into it. In practice it is found that even when rib edges 71 do not cut clear through the material they weaken it enough so that it breaks in tension or is thrown off by centrifugal force. Thus the accumulation of wrapped plant matter and resultant jamming of the machine, is virtually eliminated.

The ribs 70 also assist in cooling the head and bearing, and provide improved structural strength to the cap 30.

The inventor claims:

1. An improved rotary cutting head for a device for mowing and trimming vegetation by flails formed of elongated substantially flexible fibers projecting radially from the head, comprising:
    a cylinder skirt portion of predetermined diameter,
    upper and lower flange portions bounding coaxially the ends of the skirt portion, said flange portions being larger diameter than said skirt diameter,
    at least one grommet extending through said skirt portion between said flanges to receive one of the flails therethrough, and
    a ramp portion on said skirt portion circumferentially adjacent at least one side of each said grommet and extending radially outward to an edge portion beyond said skirt diameter and said grommet to protect the grommet from rotational impact with stationary objects.

2. A cutting head according to claim 1, wherein:
    each said ramp portion is of generally wedge configuration with its apex faired into said cylindrical skirt, said wedge lying against said skirt with an edge of its head portion being the edge portion, and
    said edge portion being rounded adjacent said grommet.

3. A cutting head according to claim 1, and further comprising:
    a generally disc-like top surface on a body portion of the head,
    a plurality of radially extending ribs on said top surface,
    each said rib having a sharp upwardly directed cutting edge on top, and
    each said rib being higher toward the center of said top surface,
    said ribs cutting into plant matter wrapped around the body to deter accumulation of said matter.

4. A cutting head according to claim 3, and further comprising:
    a stationary bearing block terminating in a lower collar-like portion,
    said ribs each having a steeply inclined sharp inner rib segment terminating radially inwardly closely below said collar-like portion,
    whereby said segments operate to cut said plant matter to prevent its jamming under the collar-like portion.

5. A cutting head according to claim 1, wherein each said grommet is formed of a molded plastic compound having a substantial filling of a solid lubricant and fine metallic particles.

6. A cutting head according to claim 1, wherein each said grommet is molded of a plastic compound containing sufficient of a molybdenum disulfide lubricating agent to substantially reduce its coefficient of friction, and thirty to sixty percent by volume of a finely-divided metallic bearing alloy containing copper.

7. A cutting head according to claim 6, wherein said metallic alloy is bronze.

8. A cutting head according to claim 7, wherein said plastic compound contains at least seventy percent by weight of said bronze.

9. A cutting head according to claim 2, and further comprising:
    a generally disc-like top surface on a rotating body portion of said head, a stationary bearing block above said top surface and terminating in a generally annular lower surface, and a plurality of radially-extending ribs on said top surface of generally triangular cross-section with sharp top edges, each said rib having an upwardly-inclined segment at its inner portion, said inclined segment rising substantially steeply toward the center and terminating closely under said annular lower surface of said bearing block.

10. A cutting head according to claim 7, wherein:
said grommets are composed of a molded organic plastic material filled with sufficient dry powdered molybdenum disulfide lubricant to substantially reduce its coefficient of friction, and with at least about thirty percent by volume of a finely-divided cuprous bearing alloy.

* * * * *